Patented June 27, 1939

2,163,620

UNITED STATES PATENT OFFICE 2,163,620

METHOD OF PREPARING PECTIN

Philip Bliss Myers, Scarsdale, N. Y., assignor to Sardik Incorporated, Jersey City, N. J., a corporation of Delaware No Drawing. Application September 11, 1937, Serial No. 163,387

17 Claims. (Cl. 260—210)

This invention relates to pectin and more particularly to the preparation of pectin from raw material.

The raw material which at the present time constitutes the main source of pectin is either the residue from cider mills known as apple pomace, or the white part of citrus fruits known as albedo. Pectin is extracted by heating the material in acidified water under carefully controlled conditions of time, temperature, and hydrogen ion concentration to obtain as large a number of jelly units as possible. The extract so obtained is a liquid dispersion of a fairly high grade pectin which imparts a relatively high viscosity to the extract. Because of the high viscosity it is necessary to add excessive amounts of water during the extraction operation in order to simplify the recovery of the pectin and the clarification of the extract, and this results in an extract having a relatively low pectin concentration, usually from 0.2% to 0.6%.

It is, of course, necessary to recover the pectin from the extract so made. One method of recovery which is very generally used at the present time is to precipitate the pectin by alcohol. However, due to the large volumes of alcohol required, this is a costly process and is commercially possible only after concentration of the pectin extract. Because of the fact that pectin deteriorates rapidly at high temperatures, the extract must be concentrated at low temperatures and this requires the use of a costly vacuum evaporation system. At the same time, the alcohol precipitation of pectin from the concentrated extract results in a product containing a high percentage of impurities which are also precipitated by the alcohol and occluded by the voluminous pectin precipitate. While the percentage of these impurities may be reduced by repeated precipitation with alcohol, such a process is not only time consuming and expensive, but also results in loss of jelly units.

The fact that pectin can also be recovered by ionic precipitation has been noted by several investigators. For example, Von Fellenberg (Uber die Konstitution des Pektinkorper, Biochem, Z. 85, 118-161 (1918)) found that certain pectins could be precipitated by adding to the extract such salts as copper sulphate, lead nitrate, basic and neutral lead acetate, and ferric chloride. Von Fellenberg recognized that the pectin molecule contains acid groups or carboxyl groups some of which are methylated. He also found that splitting of the methoxyl groups from the pectin molecule made more carboxyl groups available for combination with metallic ions and rendered easier the precipitation of pectin therewith. However, it should be noted that Von Fellenberg had only pectin of a relatively low jelly grade to work with.

Within recent years much has been added to our knowledge of pectin and the process of extracting pectin from raw materials has been greatly improved, so that pectin can now be extracted under carefully controlled conditions which minimize its destruction and result in high yields of high grade pectin. The processes employed, however, do not liberate sufficient carboxyl groups from the pectin molecule by splitting off methoxyl groups therefrom to provide a pectin which can be easily precipitated by most metallic ions. Until comparatively recently no method was successful for splitting off these methoxyl groups to render the pectin precipitatable without also lowering the jelly grade of the pectin beyond any feasible point. The art was first shown how to do this by work done at the University of Delaware Agricultural Experiment Station and described in the Station Bulletins Nos. 168 of 1931 and 187 of 1934, namely, by extracting at a comparatively low temperature and low pH for a long period of time. By such a process a high grade pectin is obtained which has sufficient carboxyl groups available to permit precipitation of high grade pectin by certain metallic ions.

Inasmuch as ionic precipitation of pectin produces a metallic pectinate, that is to say, a pectin precipitate having metallic ions combined with the pectin, it is necessary to remove the metal from the pectin precipitate in order to obtain a pure product. This can be done in a number of different ways, but most satisfactorily by washing the precipitate in acidified alcohol. The precipitated metallic pectinate must, however, be dried prior to such washing due to the fact that considerable loss of grade will result if the undried precipitate is washed in alcohol. Also, the drying operation, particularly when conducted at atmospheric pressure, causes such deterioration in the jelly grade of the pectin as to render the entire process commercially impractical, unless it is carried on by means of a costly vacuum system. However, even with such systems the drying operation causes some deterioration in the jelly grade of the pectin.

An object of this invention is to provide an improved method of obtaining high grade pectin from raw material.

A further object is to provide a method of preparing pectin from raw material by ionic precipitation of such character as to permit subsequent drying of the pectin precipitate substantially without loss of jelly grade.

These and other objects which will be apparent to those skilled in the art are attained by means of the present invention, a preferred embodiment of which is hereinafter described.

In the present invention pectin which has been extracted from any suitable raw material in any way desired is precipitated from either the concentrated or unconcentrated extract by adding to the extract a metallic salt which will not only unite with the pectin molecule to cause precipitation without requiring any preliminary treatment of the pectin to reduce its methoxyl content, but will also produce a pectin precipitate capable of being dried at atmospheric pressure substantially without loss of jelly grade.

I have found that the purposes of the present invention can be accomplished by employing certain copper salts to produce the pectin precipitate.

In one embodiment of the invention I add copper in the form of basic copper carbonate to the pectin extract in the proportion of approximately 1 pound of copper for every 14 pounds of pectin. The liquid is vigorously agitated and heated to a temperature of not more than 60° C., and preferably to about 40° C. During agitation, sufficient alkali preferably in the form of an alkali carbonate or bicarbonate is added to adjust the pH to approximately 3.0. The exact amount of alkali required for this purpose may vary in each case depending upon the pH of the original extract. The amount needed can be determined in each case by simple tests well known in the art. I preferably use sodium bicarbonate or sodium carbonate, but ammonia as well as the carbonates or bicarbonate of potassium can be used.

The amount of copper necessary is dependent upon the pH at which the precipitation is carried out and the above proportions and values are those which I have so far found the most efficient. For example, at a pH of 2.50, 1 pound of copper will precipitate approximately 5.0 pounds of pectin. At a pH of 2.75, 1 pound of copper will precipitate approximately 14.1 pounds of pectin, while at a pH of 3.0, 1 pound of copper will precipitate approximately 15.4 pounds of pectin. At pH's up to 3.5 further small savings in copper may be obtained.

After the alkali is added the liquid is stirred well until the pH has come to equilibrium. The pectin precipitates in the form of a copper-pectin salt which may be termed copper pectinate, in which the copper has taken the place of the hydrogen ions in at least a part of the free carboxyl groups of the pectin molecule. The precipitate is allowed to settle and is filtered out by any known method. It is washed preferably with water to reduce the impurities, and dried.

For example, I have used the basic copper carbonate known as "mountain green", $$CuCO_3.Cu(OH)_2,$$

which by test was found to contain 54.79% copper. To 100 pounds of pectin extract containing the .3 pound of pectin I added sufficient mountain green carbonate to provide copper in the ratio of 1 pound of copper to 14 pounds of pectin. This meant adding .0388 pound of the mountain green carbonate to the extract. The solution was neutralized to a pH of 3.0 by adding .24 pound of sodium bicarbonate. The copper pectin precipitate was filtered out, washed and subsequently dried.

The basic copper carbonate known as "mountain blue", $2CuCO_3.Cu(OH)_2$ can also be used. In a typical sample, the mountain blue carbonate contained by test 54.29% copper. Therefore, in order to obtain a ratio of 1 pound of copper to 14 pounds of pectin, .0394 pound of the mountain blue carbonate should be dissolved in 100 pounds of pectin extract containing .3 pound of pectin. This solution should also be neutralized to a pH of 3.0 and the copper pectin precipitate filtered out, washed and dried.

In another embodiment of the invention I add copper in the form of copper chloride to the pectin extract in order to precipitate the pectin in the form of the so-called copper pectinate. The chloride, like the basic carbonate above described, is added in the proportion of 1 pound of copper for every 14 pounds of pectin. Except for the difference in the copper salt, the process using the copper chloride is similar to the process using the basic copper carbonate and a similar copper pectinate is obtained.

For example, in using copper chloride to precipitate pectin from 100 pounds of extract containing .3 pound of pectin, I add .0574 pound of the salt $CuCl_2.2H_2O$ to provide copper in the ratio of 1 pound of copper to 14 pounds of pectin. The pH of the solution should be adjusted to 3.0 and the copper pectin precipitate filtered out, washed and dried.

In another embodiment of the invention I add copper in the form of copper acetate, $$Cu(C_2H_3O_2)_2.H_2O$$

in sufficient quantity to provide the above described proportions of copper to pectin.

When any of the above set forth copper salts is employed to precipitate the pectin and an alkali carbonate is used to set the pH, it will be found possible to dry the resulting copper pectinate at atmospheric pressure on a heated drying surface without causing any substantial deterioration in the jelly grade of the pectin, and the drying operation can be made continuous by drying on the outer face of an interiorly heated rotating drying drum. The precipitate can be continuously fed to the rotating drum, dried thereon and then removed therefrom by any suitable scraper, such as a steel blade pressed against the drum face.

The temperature and time of drying are variable to some extent ranging from a drying period of about 30 seconds on a drum having a surface temperature of about 98° C., to a period of about 5 seconds on a drum having a surface temperature of about 120° C. I have so far obtained the best results by drying the precipitate for about 12 seconds on a drum having a surface temperature ranging from about 104° C. to about 115° C. The dry copper pectinate is removed from the drum in the form of a substantially continuous film by the scraper.

If desired, the precipitate can be dried in any other way such, for example, as by heating in a vacuum oven to not over 60° C.

The dry copper pectinate is then ground and leached in an 85% alcohol bath containing sufficient acid such, for example, as 8% to 12% concentrated hydrochloric acid, for approximately 30 minutes to remove the copper therefrom. The pure pectin can then be dried and packaged in powdered form, it can be dispersed in water and bottled as a pure pectin concentrate, or the dispersion can be dried in the manner described in Cowgill U. S. Patent No. 1,973,613 to obtain the dry pectin in a more easily dispersible film form. When the dry precipitate is in film form it need not be ground, but the film as such can be subjected to the leaching operation.

The pectin product is then pressed to remove as much alcohol as possible and any remaining alcohol can be removed in a suitable drier such as a rotary vacuum drier having a temperature of not more than 60° C.

The result is a pure pectin of high jelly grade. When in film form, as pointed out in Cowgill Patent No. 1,973,613, it is more readily dispersible than in powder form. If still greater dispersibility is desired the pectin can be treated in the manner set forth in my copending application Serial No. 41,255, filed September 19, 1935.

It will be apparent that the present invention can be variously modified and adapted within the scope of the appended claims.

I claim:

1. The process of preparing pectin from raw material which consists in forming a liquid extract of pectin, then precipitating the pectin by adding to the extract a copper salt taken from the group consisting of basic copper carbonate, copper chloride and copper acetate to form a copper-pectin precipitate, and drying said precipitate.

2. The process of preparing pectin from raw material which consists in forming a liquid extract of pectin, then precipitating the pectin by adding to the extract a copper salt taken from the group consisting of basic copper carbonate, copper chloride and copper acetate to form a copper-pectin precipitate, drying said precipitate and removing the metal from said precipitate.

3. The process of preparing pectin from raw material which consists in forming a liquid extract of pectin, and then precipitating the pectin from the extract by adding thereto a copper salt taken from the group consisting of basic copper carbonate, copper chloride and copper acetate to form a copper pectin precipitate.

4. The method of preparing pectin from raw material which consists in forming a liquid extract of pectin, dissolving basic copper carbonate therein, adjusting the reaction of the solution to a predetermined pH value, separating the copper-pectin precipitate therefrom and drying said precipitate.

5. The method of preparing pectin from raw material which consists in forming a liquid extract of pectin, dissolving basic copper carbonate therein, adjusting the reaction of the solution to a pH of approximately 2.5 to 3.5, separating the copper-pectin precipitate therefrom, drying said precipitate, and removing the copper therefrom.

6. The method of preparing pectin from raw material which consists in forming a liquid extract of pectin, dissolving basic copper carbonate therein, adjusting the reaction of the solution to a pH of approximately 2.5 to 3.5, separating the copper-pectin precipitate therefrom, drying said precipitate, and removing the copper therefrom by leaching in an acid-containing alcohol bath.

7. The method of preparing pectin from raw material which consists in forming a liquid extract of pectin, dissolving a copper salt taken from the group consisting of basic copper carbonate, copper chloride, and copper acetate therein, adding sodium carbonate in an amount sufficient to adjust the reaction of the solution to a pH of approximately 2.5 to 3.5, separating the copper-pectin precipitate therefrom, drying said precipitate, and removing the copper therefrom by leaching in an acid-containing alcohol bath.

8. The method of preparing pectin from raw material which consists in forming a liquid extract of pectin, dissolving a copper salt taken from the group consisting of basic copper carbonate, copper chloride, and copper acetate therein, adjusting the reaction of the solution to a pH of approximately 2.5 to 3.5, separating the copper-pectin precipitate therefrom, drying said precipitate, and removing the copper therefrom by leaching in an alcohol bath containing from 8% to 12% hydrochloric acid.

9. The method of preparing pectin from raw material which consists in forming a liquid extract of pectin, dissolving a copper salt taken from the group consisting of basic copper carbonate, copper chloride, and copper acetate therein, adjusting the reaction of the solution to a pH of approximately 2.5 to 3.5, separating the copper-pectin precipitate therefrom, drying said precipitate, removing the copper therefrom by leaching in an acid-containing alcohol bath, washing the pectin to remove excess acid, and drying said pectin.

10. The method of preparing pectin from raw material which consists in forming a liquid extract of pectin, dissolving a copper salt taken from the group consisting of basic copper carbonate, copper chloride and copper acetate therein, adjusting the reaction of the solution to a pH of approximately 2.5 to 3.5, separating the copper-pectin precipitate therefrom, applying said precipitate to a heated drying surface and drying it thereon, removing the dry precipitate from said surface in the form of a substantially continuous film, removing the copper from said film by leaching in an acid-containing alcohol bath, and drying said film.

11. The method of preparing pectin from raw material which consists in forming a liquid extract of pectin, dissolving basic copper carbonate therein in an amount equal to approximately 1 pound of copper to every 10 to 15 pounds of pectin, adding sufficient sodium bicarbonate to adjust the reaction of the solution to a pH of approximately 2.5 to 3.5, separating the copper-pectin precipitate therefrom, drying the precipitate, removing the copper therefrom by leaching in an acid-containing alcohol bath, and drying the pectin.

12. The method of preparing pectin from raw material which consists in forming a liquid extract of pectin, dissolving basic copper carbonate therein in an amount equal to approximately 1 pound of copper to every 10 to 15 pounds of pectin, adding sufficient alkali to adjust the reaction of the solution to a pH of approximately 2.5 to 3.5, separating the copper-pectin precipitate therefrom, drying the precipitate, removing the copper therefrom by leaching in an acid-containing alcohol bath, and drying the pectin.

13. The method of preparing pectin from raw material which consists in forming a liquid extract of pectin, dissolving basic copper carbonate therein in an amount sufficient to provide approximately 1 pound of copper for every 10 to 15 pounds of pectin, adding sodium bicarbonate to adjust the reaction of the solution to a pH of approximately 2.5 to 3.5, separating the copper-pectin precipitate therefrom, applying the precipitate to a heated drying surface and drying it thereon, removing the dry precipitate from said surface in the form of a substantially continuous film, removing the copper from said film by leaching in an alcohol bath containing approximately 8% to 12% concentrated hydrochloric acid, removing excess acid from said film by washing with fresh alcohol, and drying said film.

14. The process of preparing pectin from raw material which consists in forming a liquid extract of pectin, dissolving copper chloride therein, adjusting the reaction of the solution to a pH of approximately 2.5 to 3.5, separating the copper-pectin precipitate therefrom, and drying said precipitate.

15. The process of preparing pectin from raw material which consists in forming a liquid extract of pectin dissolving copper chloride therein, adjusting the reaction of the solution to a pH of approximately 2.5 to 3.5, separating the copper-pectin precipitate therefrom, drying said precipitate, and removing the copper therefrom.

16. The process of preparing pectin from raw material which consists in forming a liquid extract of pectin, dissolving copper chloride therein, adjusting the reaction of the solution to a pH of approximately 2.5 to 3.5, separating the copper-pectin precipitate therefrom, drying said precipitate, and removing the copper therefrom by leaching in an acid-containing alcohol bath.

17. The method of preparing pectin from raw material which consists in forming a liquid extract of pectin, dissolving copper acetate therein, adjusting the reaction of the solution to a pH of approximately 2.5 to 3.5, separating the copper-pectin precipitate therefrom, and drying said precipitate.

PHILIP BLISS MYERS.